US006854758B2

(12) United States Patent
Hou et al.

(10) Patent No.: US 6,854,758 B2
(45) Date of Patent: Feb. 15, 2005

(54) COLLAPSIBLE STROLLER

(75) Inventors: Hung-Chung Hou, Chia-I (TW); Kun-Chang Lo, Chia-I (TW)

(73) Assignee: Link Treasure Limited, Tai Po (TW)

( * ) Notice: Subject to any disclaimer, the term of this patent is extended or adjusted under 35 U.S.C. 154(b) by 82 days.

(21) Appl. No.: 10/318,123

(22) Filed: Dec. 13, 2002

(65) Prior Publication Data

US 2003/0111826 A1 Jun. 19, 2003

(30) Foreign Application Priority Data

Dec. 19, 2001 (TW) .......................................... 90222627 U (51) Int. Cl.⁷ ................................................. B62B 1/00

(52) U.S. Cl. ........................................ 280/642; 403/93

(58) Field of Search .............................. 403/83, 84, 92, 403/93; 280/642, 647, 643, 648, 649, 650, 657, 658, 47.38, 47.4, 644

(56) References Cited

U.S. PATENT DOCUMENTS

| | | | | | |
|---|---|---|---|---|---|
| 2,372,120 A | * | 3/1945 | Roberson | ..................... | 280/145 |
| 5,718,444 A | * | 2/1998 | Huang | ......................... | 280/650 |
| 5,845,666 A | * | 12/1998 | Messner | ..................... | 135/133 |
| 6,000,713 A | * | 12/1999 | Lin | ............................. | 280/647 |
| 6,068,284 A | * | 5/2000 | Kakuda | ..................... | 280/642 |
| 6,692,015 B2 | * | 2/2004 | Perego | ....................... | 280/647 |
| 6,698,773 B2 | * | 3/2004 | Hsia | ........................ | 280/47.38 |
| 2002/0024229 A1 | * | 2/2002 | Davies et al. | .............. | 296/77.1 |

* cited by examiner

Primary Examiner—Bryan Fischmann
(74) Attorney, Agent, or Firm—Birch, Stewart, Kolasch & Birch, LLP (57) ABSTRACT

The collapsible stroller uses a rear support bracket of a canvas bracket set as the main folding structure. The support bracket is fixedly connected to a rear rim section of the canopy and has two ends connecting to one end of a linkage member to drive the linkage member to fold the stroller frame. The stroller of the invention can be folded single-handedly to prevent accidental collapsing of the stroller while the stroller is moved and to avoid incidental risks.

8 Claims, 8 Drawing Sheets

COLLAPSIBLE STROLLER

FIELD OF THE INVENTION

The invention relates to a folding apparatus for strollers that can be operated single-handedly and can prevent inadvertent operations.

BACKGROUND OF THE INVENTION

Figure 1:
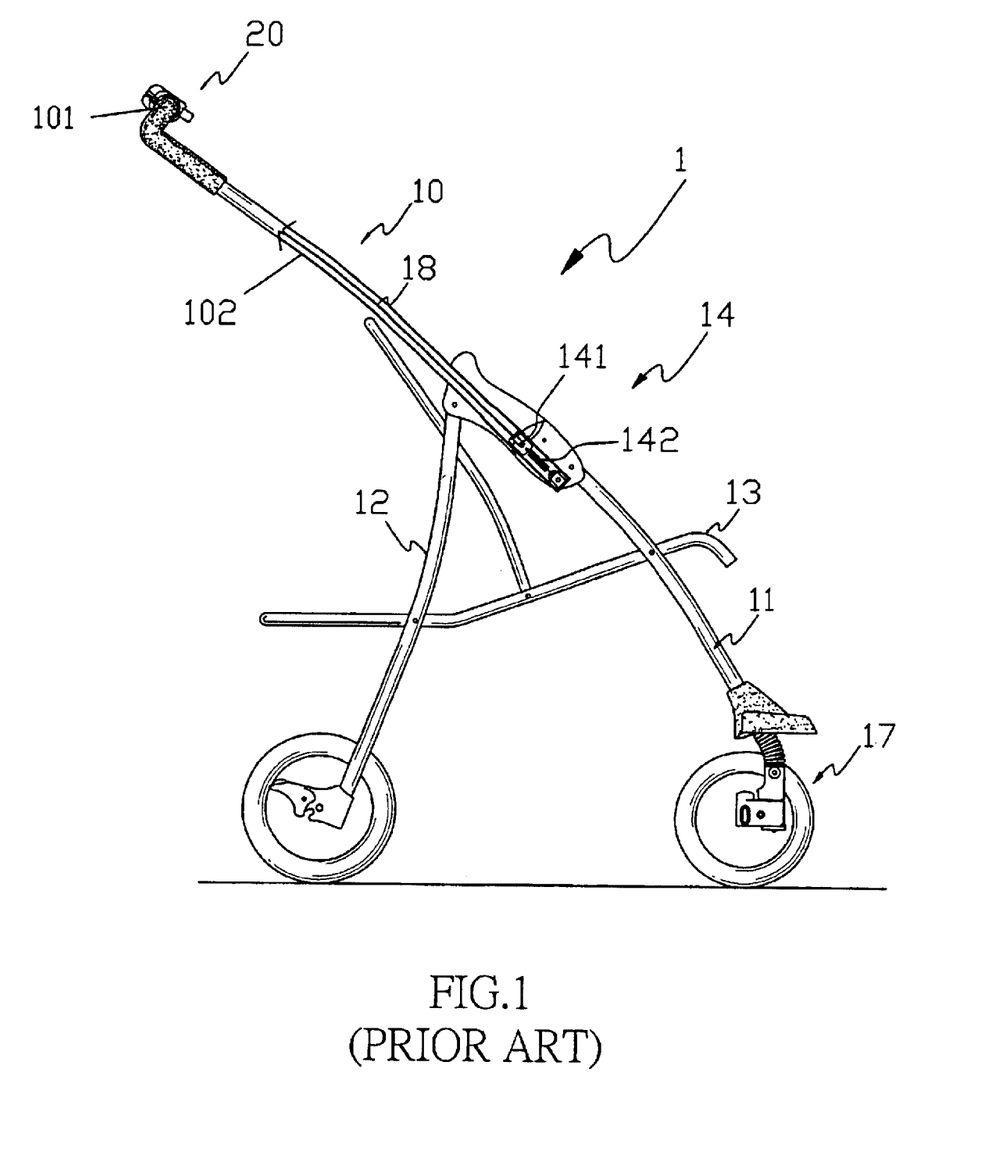
FIG. 1 is a schematic view of a conventional stroller.

Commonly used strollers can generally be deployed in an extended position for use and a collapsed position for folding and storing. When transforming the stroller from the extended position to the collapsed position, the child in the stroller must be taken out, and the folding structure must then be manipulated. In the event that the child is too young to stand or walk, the user has to hold the child with one hand and manipulate the tolding structure with another hand, which is not convenient. Hence strollers with a folding structure that can be operated single-handedly have been developed and are available on the market. For instance, U.S. Pat. No. 6,068,284 or FIG. 1 illustrates such a structure. The stroller shown in FIG. 1 includes a frame 1 and a wheel set 17 for carrying and moving the frame 1. The frame 1 mainly includes a handle tube 10, a front leg tube 11, a rear leg tube 12, a seat tube 13, a release joint set 14 and a folding controller 20. The handle tube 10 includes a handle 101 and two handle lower tubes 102. The release joint set 14 includes at least a latch bar 141 and a restoring spring 142.

The folding controller 20 is mounted on the handgrip of the handle tube to drive the latch bar 141 of the release joint set 14 through a flexible element 18 to perform release and latch operations, to thereby extend and fold the stroller.

For the frame mentioned above, the folding controller is generally located on the handgrip of the handle tube. However, when in use, the user has to grasp the handgrip to move the stroller. To place the structures of two different functions on the same location tends to cause inadvertent operation and causes accidental collapse of the stroller. This results in risk to the child in the stroller. Moreover, adding an independent folding controller increases the cost of the stroller.

SUMMARY OF THE INVENTION

The primary object of the invention is to resolve the aforementioned disadvantages with conventional folding controllers mounted on the handgrip of the handle tube. The invention has a front and rear support bracket in a canvas bracket set to serve as the main folding structure. The rear end support bracket is connected to a rear rim section of a canopy and has two end, each end connected to one end of a linkage member. The rear support bracket may drive the linkage member to release a joint set and allow folding of the frame. Hence the invention provides stroller folding function that is operable with one hand and also can prevent mistaken operation while moving the stroller and avoid dangers resulting from accidental collapsing of the stroller.

The foregoing, as well as additional objects, features and advantages of the invention will be more readily apparent from the following detailed description, which proceeds with reference to the accompanying drawings. The drawings are only to serve for reference and illustrative purposes, and are not intended to limit the scope of the invention.

DESCRIPTION OF THE PREFERRED EMBODIMENTS

Figure 2:
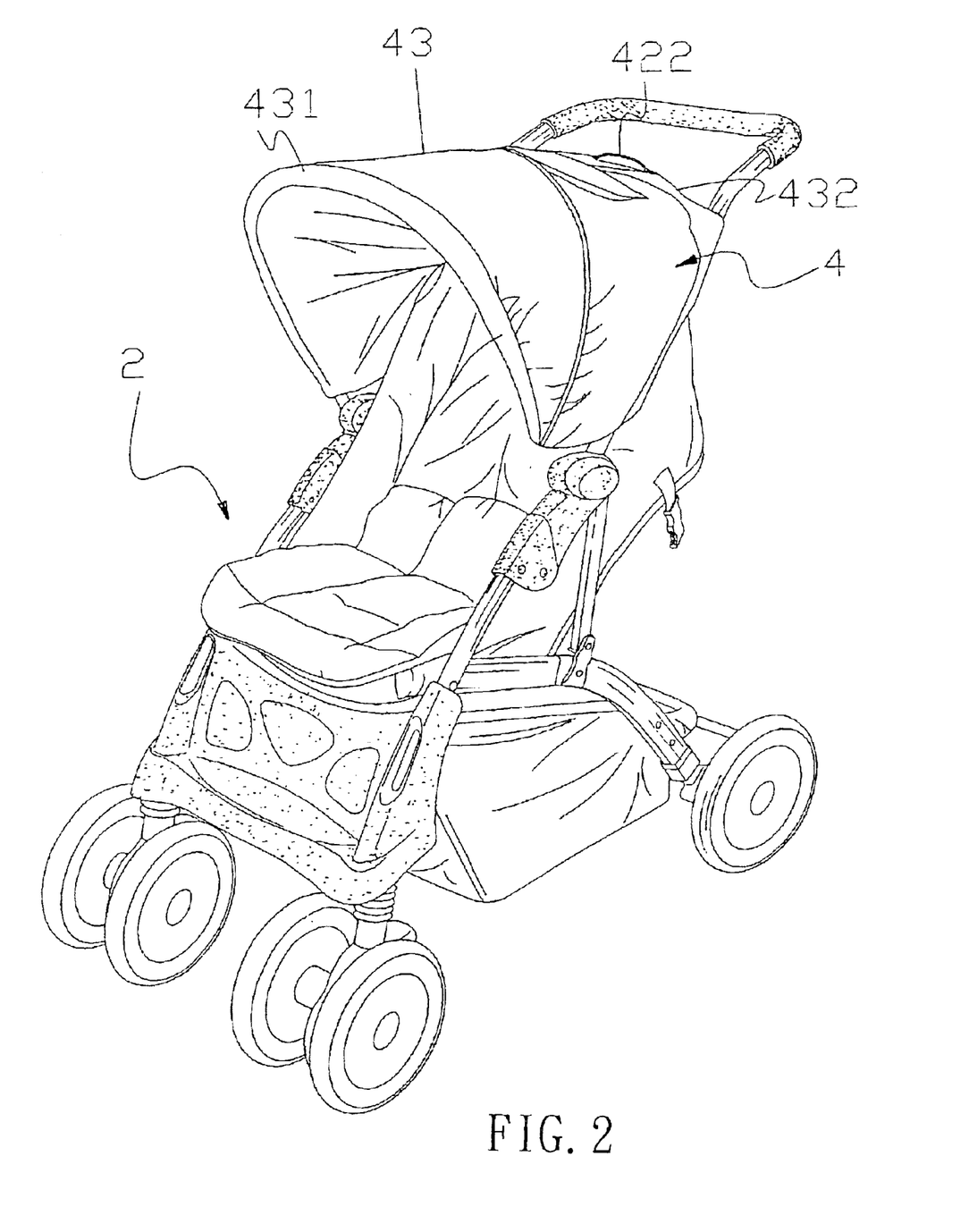
FIG. 2 is a perspective view of the stroller according to the invention.

Referring to FIG. 2, the collapsible stroller of the invention mainly includes a stroller frame 2 and a canvas bracket assembly 4.

Figure 3:
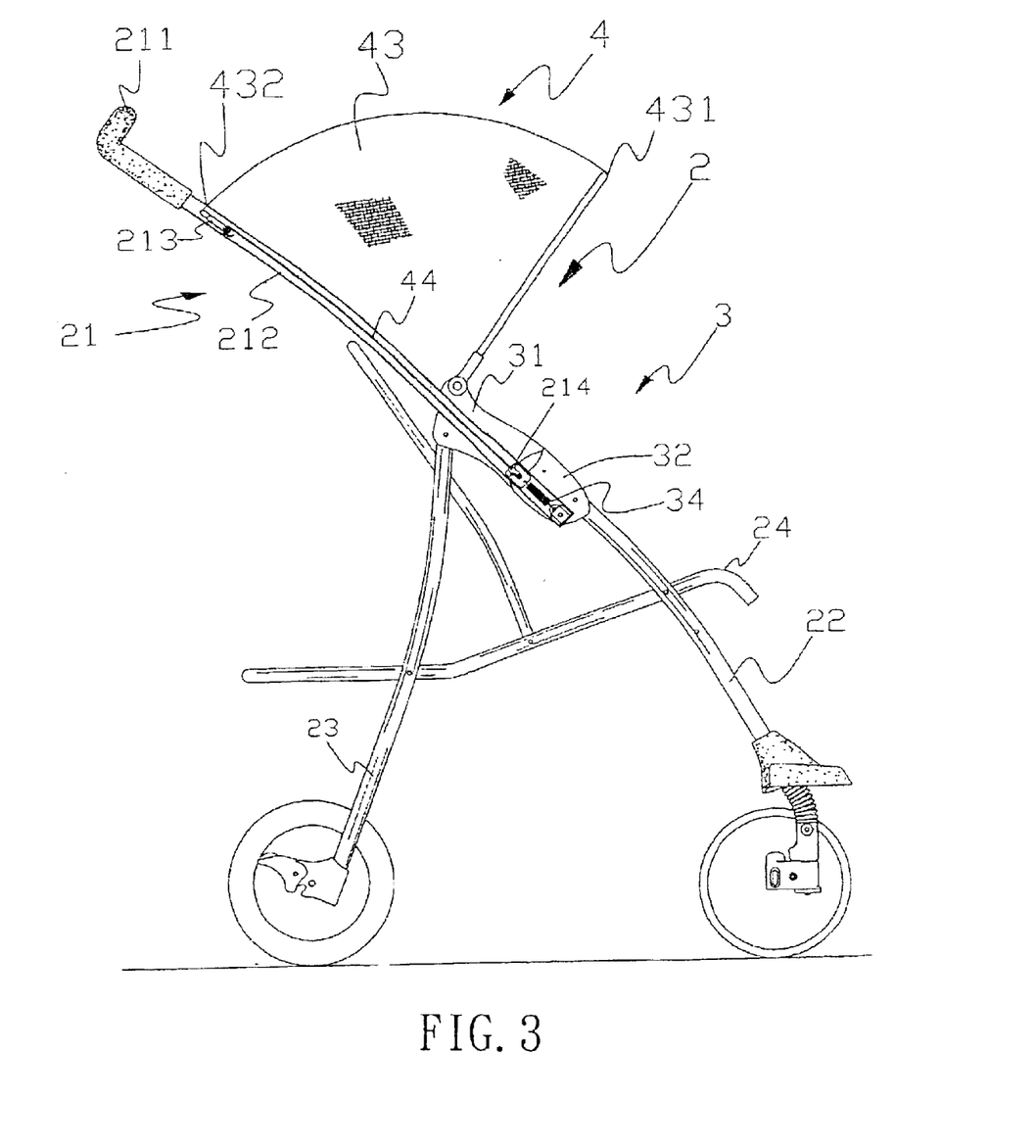
FIG. 3 is a schematic view of the structure of the invention.
Figure 4:
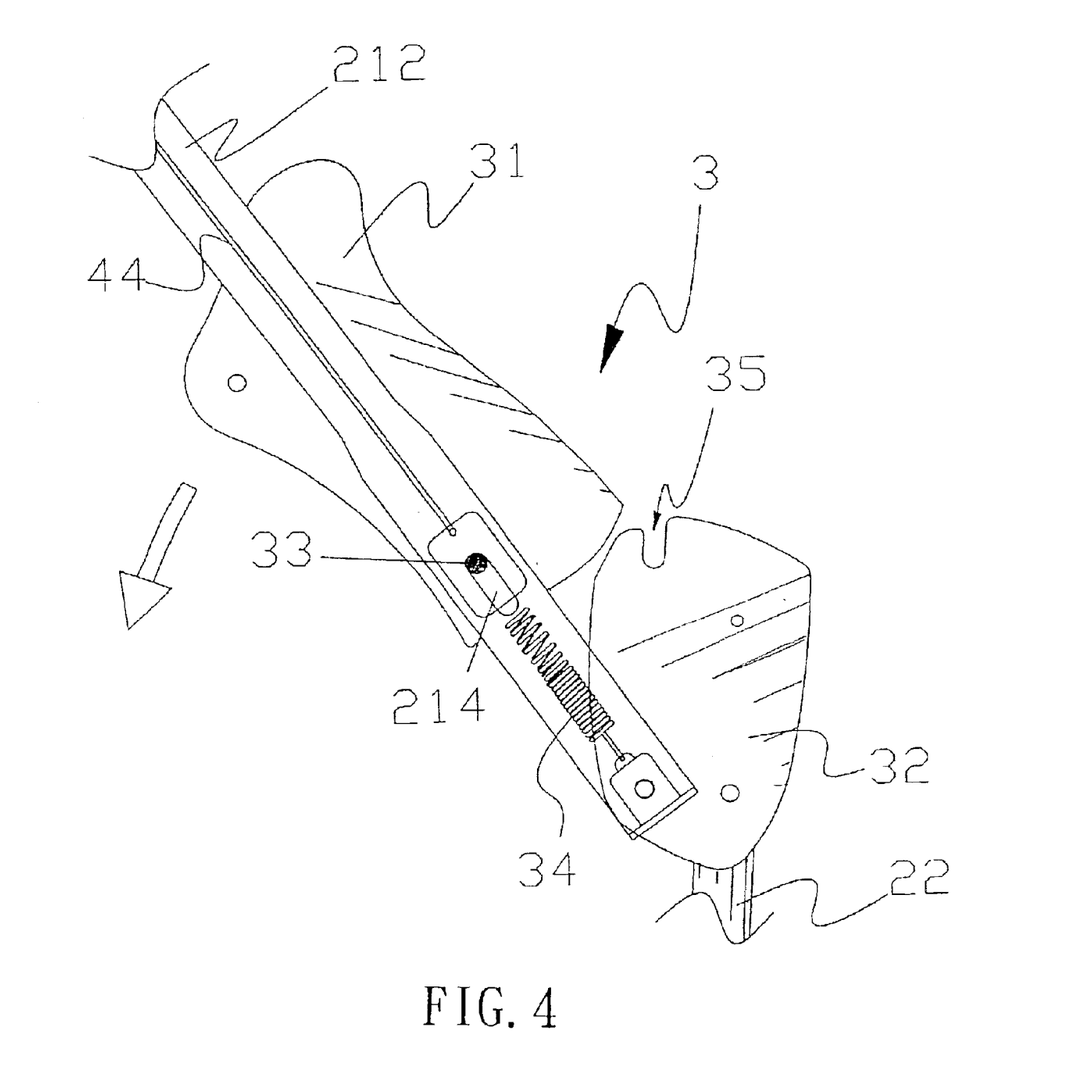
FIG. 4 is a fragmentary schematic view of the joint set of the invention in the first embodiment.

As shown in FIGS. 3 and 4, the stroller frame 2 includes a handle tube 21, a front leg tube 22, a rear leg tube 23, a seat tube 24 and a joint set 3. The handle tube 21 has a handgrip 211 and two side bars 212 extending downwards from two free ends thereof. The two side bars 212 have an upper end portion and a lower end portion forming respectively an elongated first slot 213 and a second slot 214. There is a through hole 216 located on an upper portion thereof corresponding to the first slot 213 to enable a screw element 6 to run through.

Referring to FIG. 4, the joint set 3 includes an upper joint 31 connecting to the lower end of the handle tube 21 and a lower joint 32 connecting to the upper end of the front leg tube 22, a latch pin 33 and a restoring spring 34. The upper joint 31 and the lower joint 32 are separable. The lower joint 32 has at least one latch slot 35. The latch pin 33 transversely runs through the second slot 214 at the lower end of the side bars 212 and has one end connecting to one end of a linkage member 44 of the canvas bracket assembly 4. The restoring spring 34 keeps the latch pin 33 in the latch slot 35 in normal conditions to form a latch means so that the stroller frame 2 may form an extended and latched condition. When the latch pin 33 is moved away from the latch slot 35, the stroller frame may be folded and collapsed.

Figure 5:
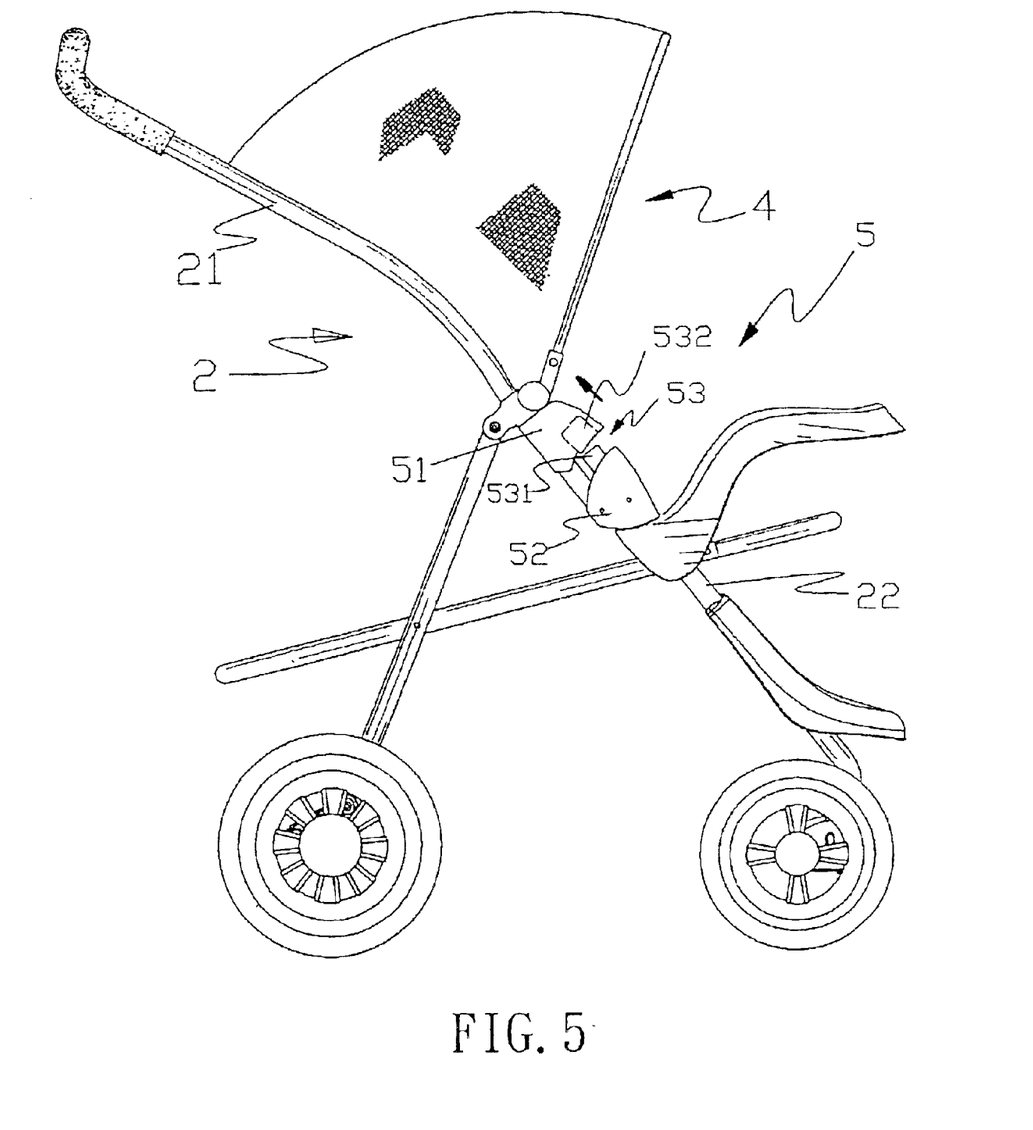
FIG. 5 is a fragmentary schematic view of the joint set of the invention in the second embodiment.

Refer to FIG. 5 for another type of joint set 5 of the invention. It includes an upper joint 51 and a lower joint 52. The upper joint 51 and the lower joint 52 have a mating latch means 53. In one embodiment of the invention, the latch means 53 includes a stub 531 and a mating trough 532. The upper joint 51 is normally anchored by the latch pin 33 running through the second slot 214 of the two side bars 212 to allow folding of the stroller. The upper joint 51 may be moved on the lower side of the handle tube 21 to allow folding of the stroller. When the trough 532 separates from the stub 531, the latched condition is released and the stroller frame may be folded and collapsed.

Figure 6:
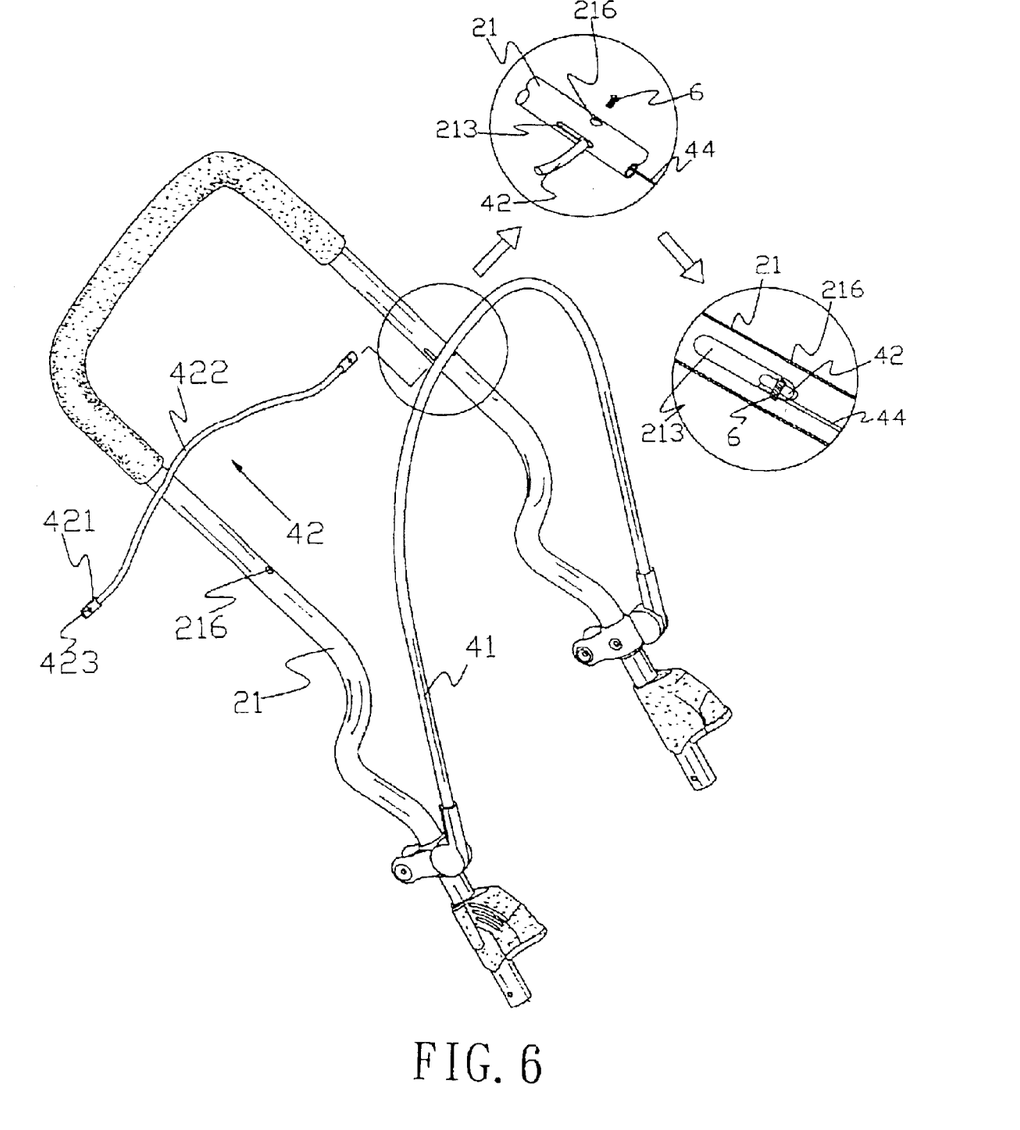
FIG. 6 is an exploded view of the canvas bracket set of the invention, partly cut away.
Figure 8:
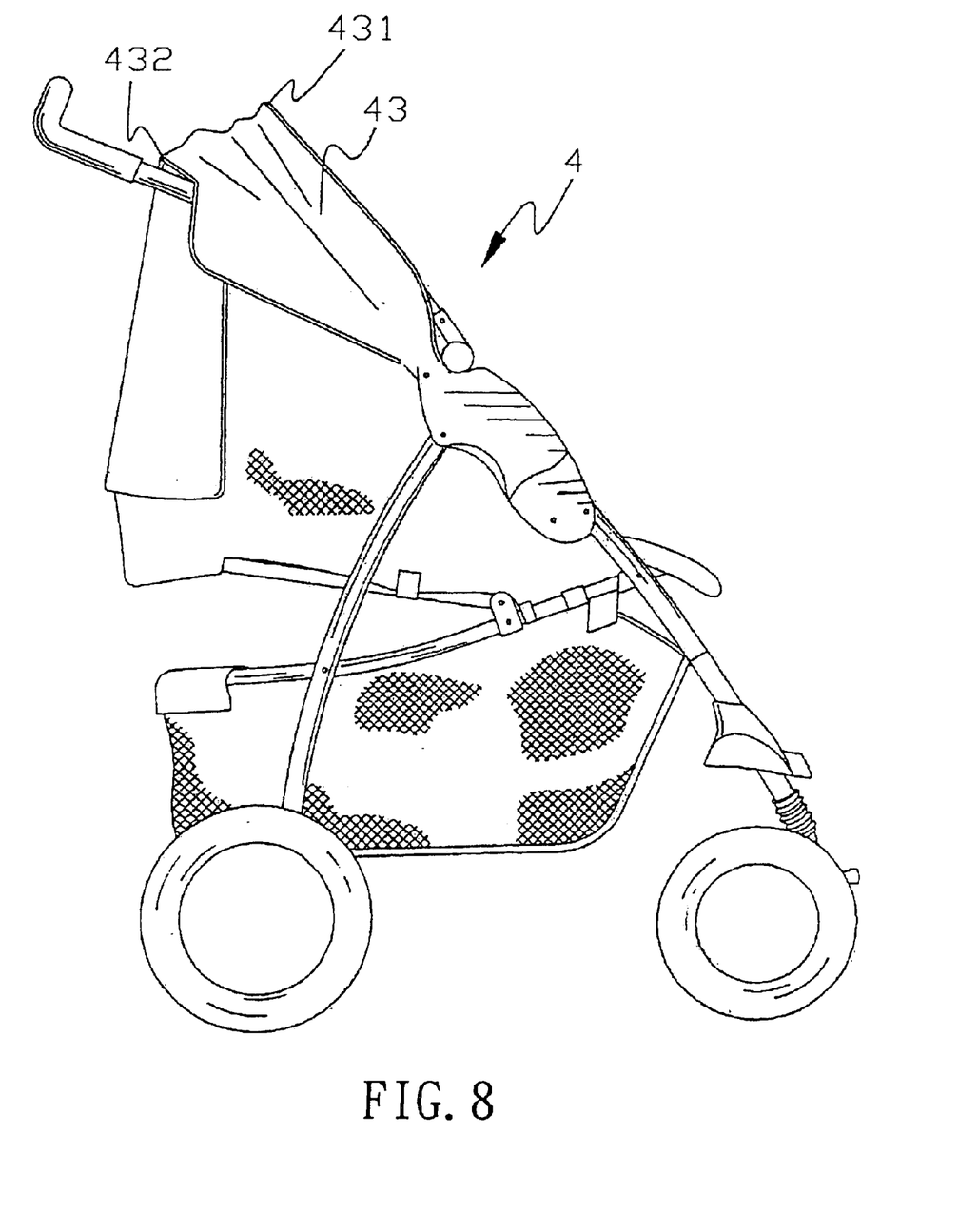
FIG. 8 is a schematic view of the invention, showing the canopy in a folding condition.

Referring to FIGS. 3 and 6, the canvas bracket set 4 is mounted on a desired position on the stroller frame 2, and may be formed in an extended state (as shown in FIG. 2) and a collapsed state (as shown in FIG. 8). According to one embodiment of the invention, the canvas bracket set is mounted on the handle tube 21 or on the upper joint 31 or 51. It includes a front support bracket 41, a rear support bracket 42, a canopy 43 and a pair of linkage members 44.

The canopy 43 is located above the seat tube 24 of the stroller frame 2 (as shown in FIG. 2) and may be extended to block sunlight from shining directly on the child. It includes at least a front rim section 431 and a rear rim section 432.

The linkage member 44 has one end connecting to the latch pin 33 of a release mechanism 3 and another end connecting to the rear support bracket 42 of the canvas bracket assembly 4. According to an embodiment of the invention, the material of the linkage member 44 may be selected based on the shape of the handle tube 21. For instance, when the two side bars of the handle tube are straight tubes, the linkage member may be steel rods. If the side bars are arched with a substantial curvature, a flexible wire may be used.

The front support bracket 41 is mounted onto the stroller frame 2 in a turnable manner, and is connected to the front rim section 431 of the canopy 43. The front support bracket 41 may be turned to extend or fold the canopy 43 as desired.

The rear support bracket 42 is fixed on the rear rim section 432 of the canopy 43. It matches the front support bracket 41 that connects to the front rim section 431 of the canopy 43 to determine the length of the canopy 43. The rear support bracket 42 includes two end sections 421 and a handgrip 422. The rear rim section 432 of the canopy 43 is fixed outside the two end sections 421 and the handgrip 422. The two end sections 421 each have an anchor hole 423. For installation, the two end sections 421 of the rear support bracket 42 are inserted into the first slot 213 of the two side bars 212 and are fastened by the screw element 6, which runs through the through hole 26 from the upper side wall of the two side bars 212 and fastens the rear support bracket 42 to one end of the linkage member 44.

Figure 7:
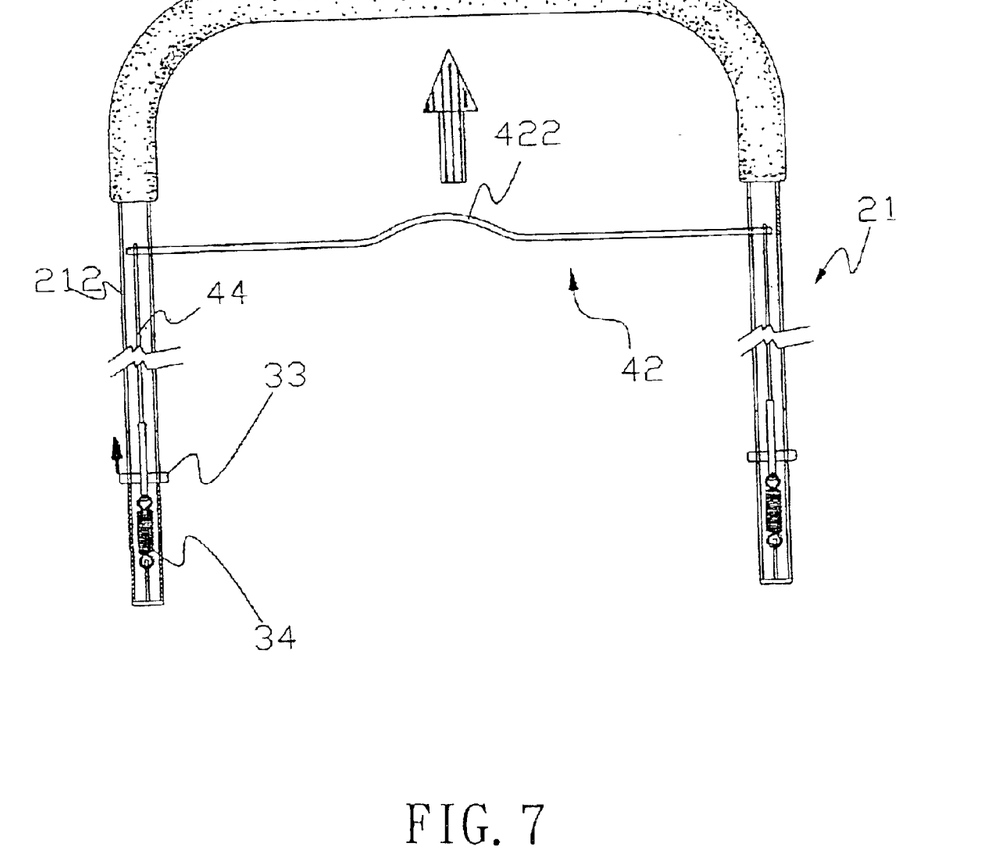
FIG. 7 is a schematic view of the invention, showing the rear support bracket in a moving condition.

Referring to FIG. 7, through the aforesaid structure, the rear support bracket 42 is movable in the first slot 213. The movement of the rear support bracket 42 drives the linkage member 44 to move upwards and release the joint set 3. Thereby the stroller frame 2 may be folded.

By means of the construction set forth above, the invention provides a rear support bracket on the canvas bracket set that may be moved upwards on two side bars of the handle tube. Thus the stroller frame may be folded single-handedly, and accidental collapsing of the stroller frame may be avoided to enhance the safety of the stroller.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A collapsible stroller, comprising:

a stroller frame having a set of tubes brackets that are foldable or extendable to a use position, the tubes brackets including a joint set for positioning the tubes brackets, the joint set employing a latch to maintain or release the use position; and a canvas bracket assembly connecting to an upper end of the stroller frame including at least a canopy, a pair of linkage members and a front and rear support bracket, the front support bracket being extendable to support the canopy, the linkage members linking the support rear bracket and the latch to allow the support rear bracket to move the latch to release the anchor condition of the stroller frame to allow for folding of the stroller.

2. The collapsible stroller of claim 1, wherein the stroller frame tubes includes a handle tube, a front leg tube, a rear leg tube and a seat tube pivotally engaged with one another.

3. The collapsible stroller of claim 2, wherein the handle tube includes a handle and two side bars which have an upper end and a lower end forming respectively an elongate first slot and a second slot.

4. The collapsible stroller of claim 2, wherein the joint set includes an upper joint and a lower joint that connect respectively to a lower end of the handle tube and an upper end of the front leg tube.

5. The collapsible stroller of claim 4, wherein the latch includes a stub located on the lower joint and a trough located on the upper joint.

6. The collapsible stroller of claim 1, wherein the canopy includes a front rim section and a rear rim section.

7. The collapsible stroller of claim 6, wherein the front support bracket is connected to the front rim section of the canopy and is mounted on the stroller frame in a turnable manner, the rear support bracket is fixedly connected to the rear rim section of the canopy.

8. The collapsible stroller of claim 7, wherein the rear support bracket includes a handgrip and two end sections, the handgrip being located in a center portion of the rear support bracket, the two end sections extending through the first slot of each of the two side bars and being movable therein, and being connected to one end of each of the pair of linkage members.

* * * * *